(12) United States Patent
Jung et al.

(10) Patent No.: US 12,455,696 B2
(45) Date of Patent: Oct. 28, 2025

(54) SUSPEND PARAMETER DETERMINATION DEVICE AND METHOD THEREOF

(71) Applicant: SK hynix Inc., Gyeonggi-do (KR)

(72) Inventors: In Ho Jung, Gyeonggi-do (KR); Min Hwan Moon, Gyeonggi-do (KR); Seung Gu Ji, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/581,404

(22) Filed: Feb. 20, 2024

(65) Prior Publication Data

US 2025/0117142 A1      Apr. 10, 2025

(30) Foreign Application Priority Data

Oct. 4, 2023    (KR) .................. 10-2023-0131358

(51) Int. Cl.
*G06F 3/06* (2006.01)

(52) U.S. Cl.
CPC .......... *G06F 3/0625* (2013.01); *G06F 3/0613* (2013.01); *G06F 3/0659* (2013.01); *G06F 3/0673* (2013.01)

(58) Field of Classification Search
CPC ..... G06F 3/0625; G06F 3/0613; G06F 3/0659; G06F 3/0673
See application file for complete search history.

(56) References Cited

U.S. PATENT DOCUMENTS

| | | | |
|---|---|---|---|
| 2015/0309751 A1* | 10/2015 | Ellis ..................... | G06F 3/0625 711/154 |
| 2022/0147460 A1* | 5/2022 | Yoon ..................... | G06N 20/00 |
| 2022/0229707 A1 | 7/2022 | Lange et al. | |
| 2023/0147294 A1 | 5/2023 | Sreedhar et al. | |
| 2023/0367488 A1* | 11/2023 | Du ........................ | G11C 16/10 |
| 2024/0071520 A1* | 2/2024 | Bukhari ............ | G11C 16/0483 |

\* cited by examiner

*Primary Examiner* — Sean D Rossiter
(74) *Attorney, Agent, or Firm* — IP & T GROUP LLP (57) ABSTRACT

A suspend parameter determination device may include a power monitoring circuit configured to monitor power consumption information of a storage device; a memory device configured to store an artificial intelligence model; and a control circuit configured to load the artificial intelligence model, input to the artificial intelligence model, performance information for the storage device and the power consumption information received from the power monitoring circuit, and transmit, to the storage device, a suspend parameter outputted by the artificial intelligence model.

15 Claims, 7 Drawing Sheets

Measuring performance information for storage device —S710

Monitoring power consumption information of storage device —S720

Inputting performance information and power consumption information to artificial intelligence model —S730

Transmitting suspend parameter outputted by artificial intelligence model to storage device —S740

| Input information | Artificial intelligence model input | Range |
|---|---|---|
| Performance information | Data throughput information | 0 ~ max throughput |
| | Delay information | 0 ~ 99.9999% |
| Power consumption information | Peak power consumption information | 0 ~ max power consumption |
| | Average power consumption information | 0 ~ max power consumption |

FIG.6

| Target operation | Suspend parameter | Range |
|---|---|---|
| Program operation | Maximum program suspend count | 1 ~ 15 |
| | Suspend delay value after program resumption | 50 ~ 400 (us) |
| Erase operation | Maximum erase suspend count | 1 ~ 10 |
| | Suspend delay value after erase resumption | 1200 ~ 2000 (us) |

FIG. 7

SUSPEND PARAMETER DETERMINATION DEVICE AND METHOD THEREOF

CROSS-REFERENCE TO RELATED APPLICATION

The present application claims priority under 35 U.S.C. § 119 (a) to Korean Patent Application No. 10-2023-0131358 filed on Oct. 4, 2023, which is incorporated herein by reference in its entirety.

BACKGROUND

1. Technical Field

Various embodiments of the present disclosure generally relate to a suspend parameter determination device and a method thereof.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory of the storage device according to the received command.

In order to ensure low latency for a read operation, the storage device may suspend a program operation or an erase operation that is being executed and instead execute the read operation with high priority.

When the number of times the storage device suspends a program operation or an erase operation increases, the possibility of satisfying a user's required performance for the storage device may increase. However, as the program operation or the erase operation is prolonged due to the suspend operation, the power consumption of the storage device may increase.

SUMMARY

Various embodiments of the present disclosure are directed to providing a suspend parameter determination device capable of satisfying a user's required performance for a storage device and at the same time optimizing the power consumption of the storage device, and a method thereof.

In an embodiment of the present disclosure, a suspend parameter determination device may include: a power monitoring circuit configured to monitor power consumption information of a storage device; a memory device configured to store an artificial intelligence model; and a control circuit configured to load the artificial intelligence model, input to the artificial intelligence model, performance information for the storage device and the power consumption information received from the power monitoring circuit, and transmit, to the storage device, a suspend parameter outputted by the artificial intelligence model. The suspend parameter may be used to control a suspend operation for a program operation or an erase operation being executed by the storage device.

In another embodiment of the present disclosure, a suspend parameter determination method may include: measuring performance information for a storage device; monitoring power consumption information of the storage device; inputting, to an artificial intelligence model, the performance information and the power consumption information; and transmitting, to the storage device, a suspend parameter outputted by the artificial intelligence model. The suspend parameter may be used to control a suspend operation for a program operation or an erase operation being executed by the storage device.

In still another embodiment of the present disclosure, a system may include: a storage device; and a suspend parameter determination device configured to monitor power consumption information of the storage device, input, to an artificial intelligence model, performance information for the storage device and the power consumption information of the storage device, and transmit, to the storage device, a suspend parameter outputted by the artificial intelligence model. The storage device may store the suspend parameter in a suspend parameter table and may control a suspend operation for a program operation or an erase operation being executed, on the basis of the suspend parameter stored in the suspend parameter table.

According to the embodiments of the present disclosure, it is possible to satisfy a user's required performance for a storage device and at the same time optimize the power consumption of the storage device.

These and other features and advantages of the invention will become apparent from the detailed description of embodiments of the present disclosure and the following figures.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
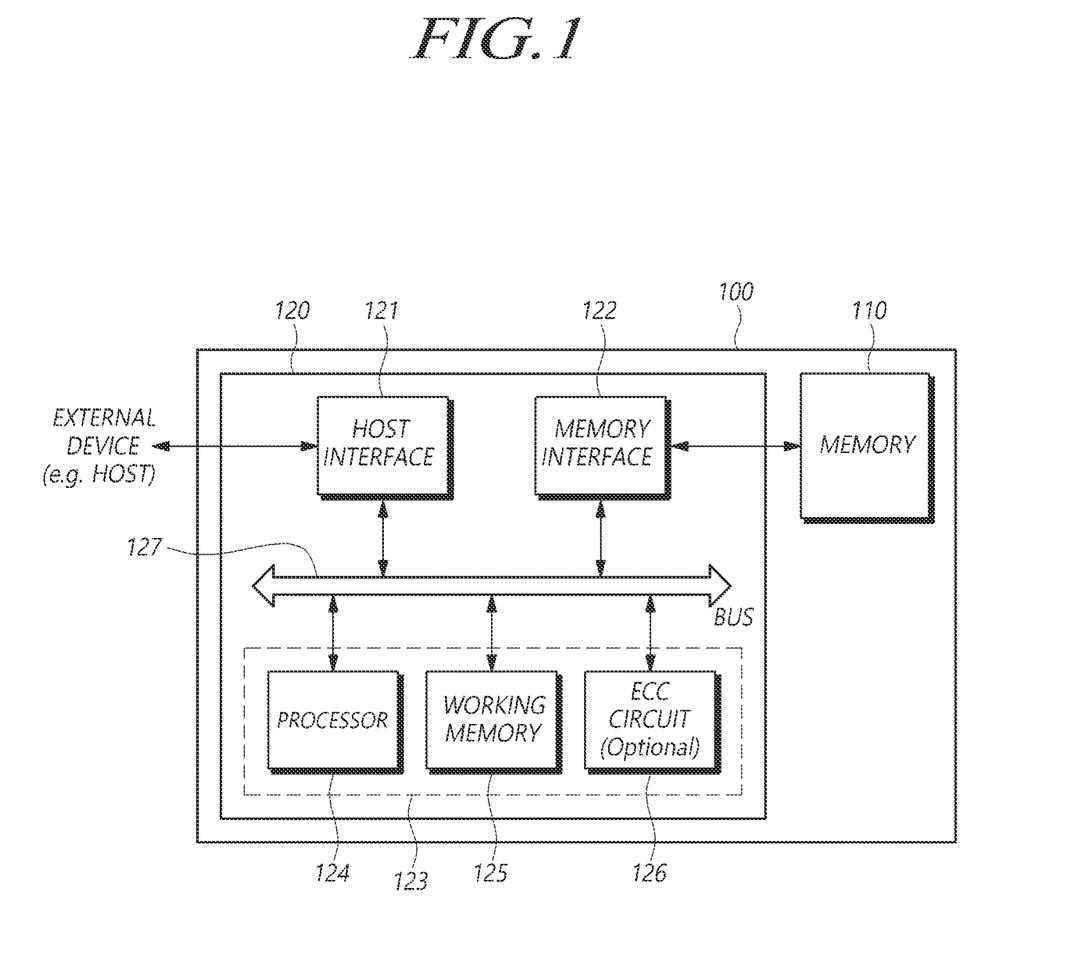
FIG. 1 is a schematic configuration diagram of a storage device according to an embodiment of the present disclosure.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, a smart wearable device, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require a storage device 100 capable of storing data.

The host may include at least one operating system (OS). The operating system may generally manage and control the function and operation of the host and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience, descriptions will describe the controller 120 and the host as devices that are separated from each other.

In the illustrated embodiment of FIG. 1, the controller 120 may include a memory interface 122 and a control circuit 123. The controller 120 may further include a host interface 121.

The host interface 121 provides an interface for communication with the host. For example, the host interface 121 provides an interface that uses at least one from among various communication standards or interfaces such as a USB (universal serial bus) protocol, an MMC (multimedia card) protocol, a PCI (peripheral component interconnection) protocol, a PCI-e or PCIe (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121 and may perform an operation of processing the received command.

The memory interface 122 may be coupled with the memory 110 to provide an interface for communication with the memory 110. The memory interface 122 may be configured to provide an interface between the memory 110 and the controller 120 in response to the control of the control circuit 123.

The control circuit 123 performs the general control operations of the controller 120 to control the operation of the memory 110. To this end, the control circuit 123 may include at least one of a processor 124 and a working memory 125. The control circuit 123 may optionally include an error detection and correction circuit (ECC circuit) 126.

The processor 124 may control general operations of the controller 120 and may perform a logic calculation. The processor 124 may communicate with the host through the host interface 121 and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing the processor 124 that executes firmware in which the corresponding operation is defined.

Firmware, is a program to be executed in the storage device 100 to drive the storage device 100, and may include various functional layers. For example, the firmware may include binary data in which codes for executing the functional layers, respectively, are defined.

For example, the firmware may include at least one selected from among a flash translation layer which performs a translating function between a logical address requested to the storage device 100 from the host and a physical address of the memory 110; a host interface layer (HIL) which serves to analyze a command requested to the storage device 100 from the host and transfers the command to the flash translation layer; and a flash interface layer (FIL) which transfers a command instructed from the flash translation layer to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, is data for managing the memory 110, and may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one of an SRAM (static RAM), a DRAM (dynamic RAM) and an SDRAM (synchronous DRAM). The controller 120 may additionally use a separate volatile memory (e.g., SRAM, DRAM) located outside the controller 120 in addition to the working memory 125.

The error detection and correction circuit 126 may detect an error bit of target data and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER) and may determine whether an error is correctable or not, by sector units. For example, when a bit error rate is greater than a reference value, the error detection and correction circuit 126 may determine that a corresponding sector is uncorrectable or a fail. On the other hand, when a bit error rate is less than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
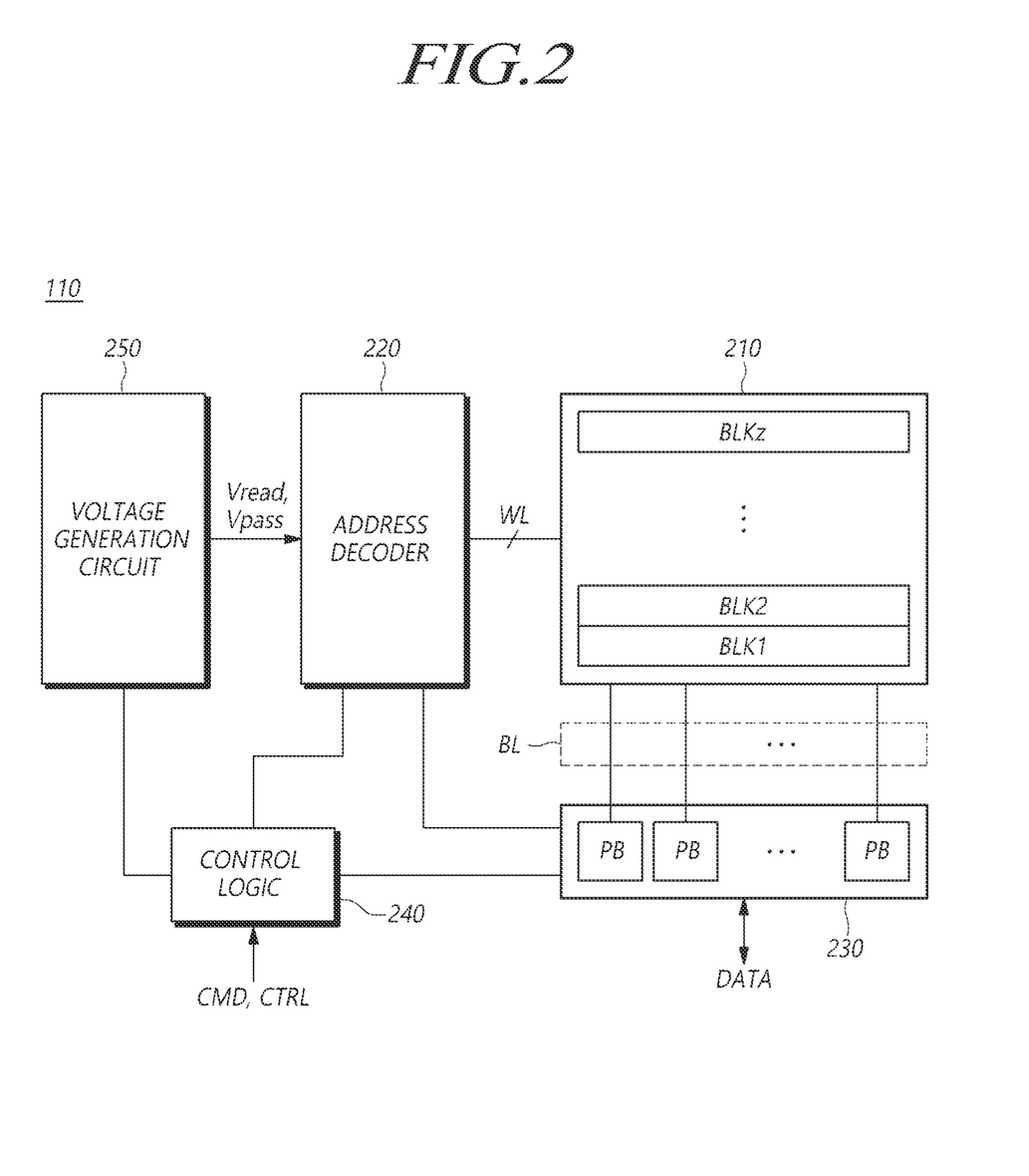
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the present disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

In the illustrated embodiment of FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block, and may apply the pass voltage Vpass to the remaining unselected word lines WL.

During a program verify operation, the address decoder 220 may apply a verify voltage generated in the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210 and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation. Further, the plurality of page buffers PB may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
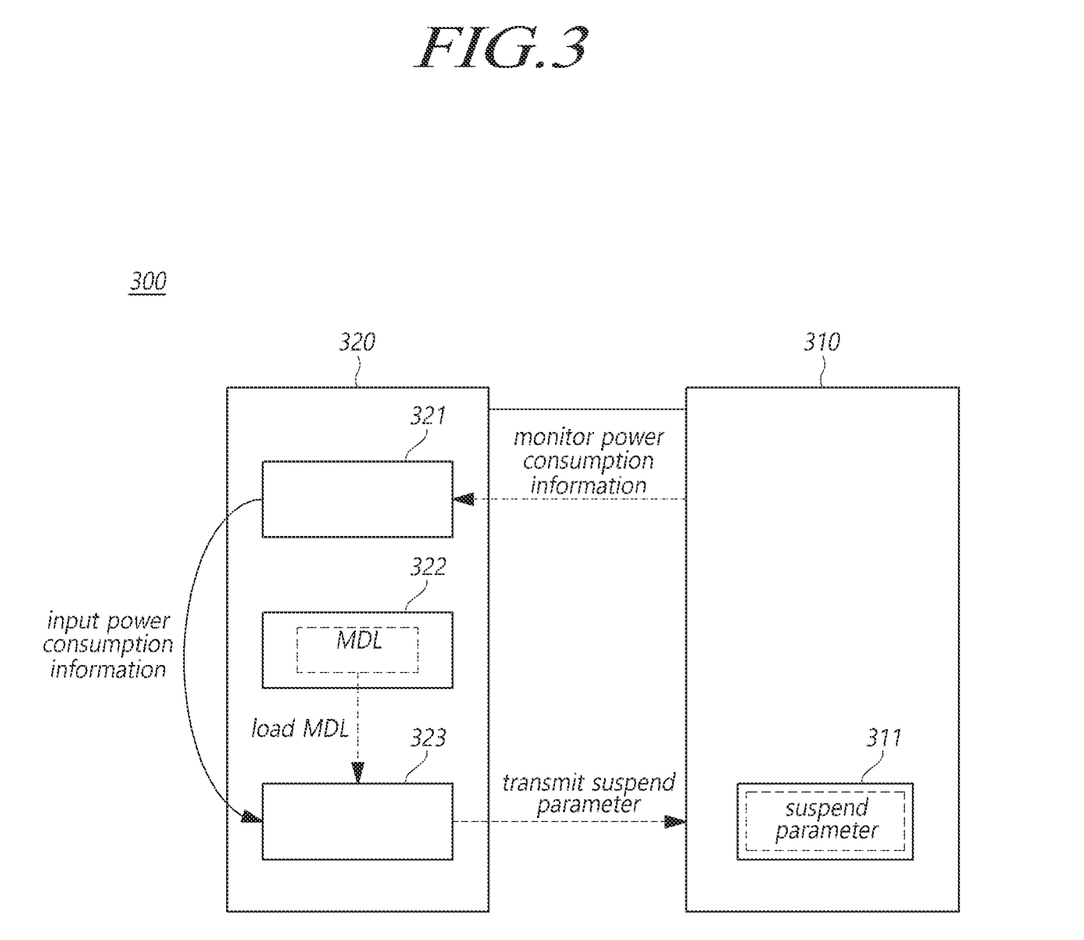
FIG. 3 is a diagram showing the schematic structure of a system according to an embodiment of the present disclosure.

FIG. 3 is a diagram showing the schematic structure of a system 300 based on an embodiment of the present disclosure.

Referring to FIG. 3, the system 300 may include a storage device 310 and a suspend parameter determination device 320.

The storage device 310 is a device which can store data. For example, the storage device 310 may be the storage device 100 described above with reference to FIG. 1. The storage device 310 may receive a read request or a write request from the suspend parameter determination device 320 or a separate computing device, and may process the read request or the write request.

The suspend parameter determination device 320 is a device which determines a suspend parameter that is a parameter used to control a suspend operation for a program operation or an erase operation being executed by the storage device 310. The storage device 310 may determine, on the basis of the suspend parameter, whether to execute the suspend operation for the program operation or the erase operation, a time point to execute the suspend operation and the number of execution times of the suspend operation.

For example, the suspend parameter determination device 320 may be the host described above with reference to FIG. 1. In this case, the suspend parameter determination device 320 may transmit a read request or a write request to the storage device 310, and at the same time, may determine a suspend parameter.

For another example, the suspend parameter determination device 320 may be a separate device which is separated from the host and the storage device 310.

The suspend parameter determination device 320 may include a power monitoring circuit 321, a memory device 322 and a control circuit 323.

The power monitoring circuit 321 may monitor power consumption information of the storage device 310.

For example, the power monitoring circuit 321 may determine power consumption information of the storage device 310 by sensing power consumed by the storage device 310 during a predetermined time period.

For another example, the power monitoring circuit 321 may request power consumption information of the storage device 310 to the storage device 310, and may determine power consumption information of the storage device 310 on the basis of a response of the storage device 310 to the request.

The memory device 322 may store an artificial intelligence model MDL. For example, the memory device 322 may be a volatile memory (e.g., an SRAM or a DRAM) or a nonvolatile memory (e.g., a NAND Flash or a NOR Flash). The artificial intelligence model MDL may be a program that has been trained on a set of data to recognize certain patterns or make certain decisions without further human intervention.

The artificial intelligence model MDL is a model which is used to determine a suspend parameter for the storage device 310.

The artificial intelligence model MDL may be a model which is previously learned on the basis of preset learning data. Performing learning on the artificial intelligence model MDL means to adjust an internal parameter of the artificial intelligence model MDL (e.g., weights of nodes included in the artificial intelligence model MDL) to satisfy a user's required performance for the storage device 310 and optimize power consumption of the storage device 310 when the storage device 310 operates on the basis of a suspend parameter outputted according to learning data inputted to the artificial intelligence model MDL.

A learning process of the artificial intelligence model MDL may be expressed as training and the result of the training may be expressed as learning, but either training or learning may be used to express the learning process or the result.

Learning on the artificial intelligence model MDL may be performed directly in the suspend parameter determination device 320 or may be performed in the separate computing device. The suspend parameter determination device 320 may load the artificial intelligence model MDL learned in the separate computing device into the memory device 322.

The control circuit 323 may load the artificial intelligence model MDL from the memory device 322, and may determine a suspend parameter for the storage device 310, using the artificial intelligence model MDL.

The control circuit 323 may include a processor or a processing core which performs an operation of outputting a suspend parameter using the loaded artificial intelligence model MDL. To this end, the control circuit 323 may drive software including instructions which define the operation of outputting a suspend parameter using the artificial intelligence model MDL.

The control circuit 323 may perform, for a preset period (e.g., 5 to 10 minutes), an operation of determining a suspend parameter for the storage device 310 using the artificial intelligence model MDL. The control circuit 323 may repeat an operation of determining a suspend parameter for the storage device 310, by a preset number of times (e.g., 1000 times).

The control circuit 323 may transmit a suspend parameter to the storage device 310. For example, the control circuit 323 may transmit a suspend parameter to the storage device 310 through a preset interface (e.g., UART).

The storage device 310 may store a received suspend parameter in a suspend parameter table 311 therein. For example, the suspend parameter table 311 may be a storage space which is allocated to the working memory 125 or the memory 110 described above with reference to FIG. 1.

The storage device 310 may control a suspend operation for a program operation or an erase operation being executed, on the basis of the suspend parameter stored in the suspend parameter table 311.

Figure 4:
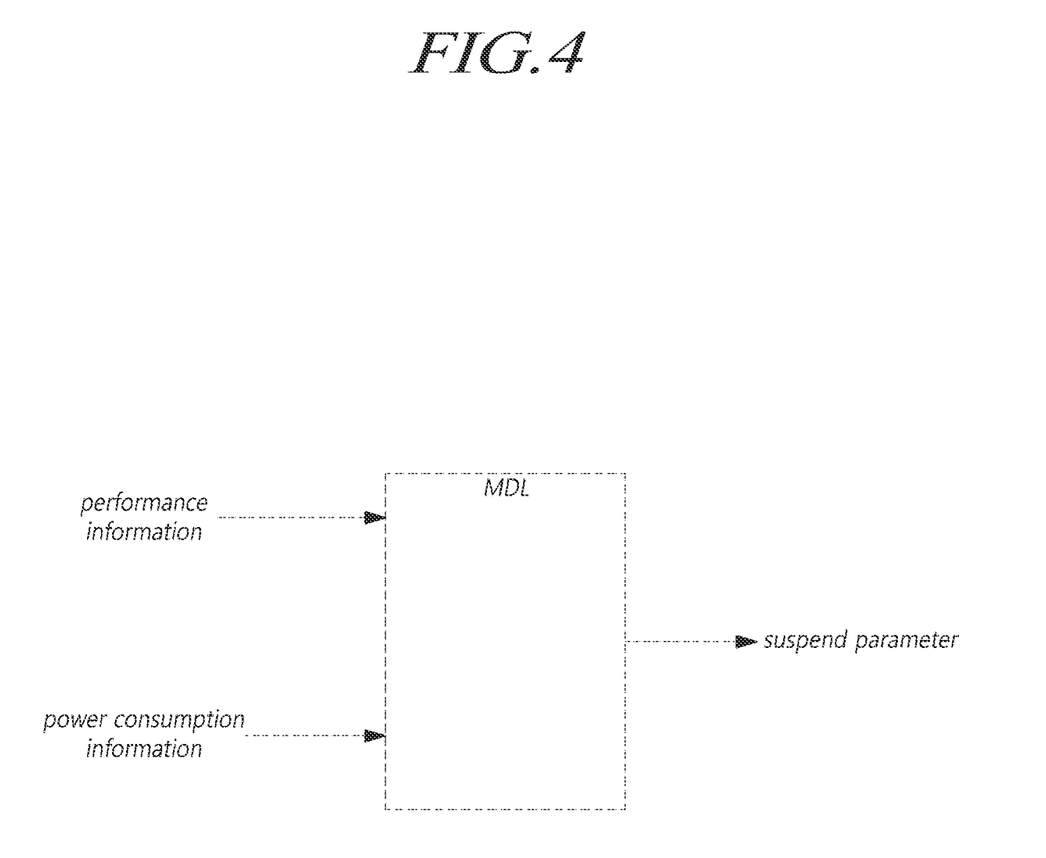
FIG. 4 is a diagram showing an input and an output of an artificial intelligence model according to an embodiment of the present disclosure.

FIG. 4 is a diagram showing an input and an output of the artificial intelligence model MDL based on an embodiment of the present disclosure.

Referring to FIG. 4, the artificial intelligence model MDL may receive performance information for the storage device 310 and power consumption information of the storage device 310.

The performance information of the storage device 310 may indicate performance of processing at least one of a read operation and a write operation for the storage device 310.

For example, the suspend parameter determination device 320 may send a request for a read operation or a write operation to the storage device 310 according to a workload type set by the user, and the storage device 310 may respond with a processing result for the request to the suspend parameter determination device 320. The suspend parameter determination device 320 may directly measure performance information of the storage device 310 on the basis of the response of the storage device 310.

For another example, the suspend parameter determination device 320 may send a request for at least one of a read operation and a write operation to the storage device 310, and after the storage device 310 processes the request, may receive, from the storage device 310, performance information of the storage device 310.

Power consumption information of the storage device 310 may be received through the power monitoring circuit 321 described above.

The artificial intelligence model MDL may output a suspend parameter for the storage device 310, on the basis of the received performance information and power consumption information. The artificial intelligence model MDL may output an optimal suspend parameter within a range that power consumption of the storage device 310 is optimized and performance information for the storage device 310 which satisfies performance requirements of the storage device 310.

The artificial intelligence models MDL may be implemented in various ways.

The artificial intelligence model MDL may be a current or future machine learning model, such as a model using algorithm-based machine learning or a model using artificial neural network-based learning.

The model using algorithm-based machine learning may be a classic machine learning model such as a tree-based model, k-Nearest Neighbors, k-Means Clustering, Principal Component Analysis (PCA), support vector machine (SVM), etc.

The tree-based model may be, for example, a decision tree model, a regression model, or a random tree model.

The artificial intelligence model MDL may be an ensemble model that solves problems by learning and combining multiple models rather than using only one learned model.

Ensemble models can prevent an overfitting problem and improve generalization performance by combining several independently learned models. Ensemble models can help improve performance when the performance of individual models cannot be secured.

Ensemble models may be broadly classified into a voting method and a boosting method.

The voting method is a method of deriving a final result by voting on results generated by multiple models. For example, the voting method may be a bagging method, which combines same types of algorithms but uses different learning data respectively. The voting method may combine different types of algorithm.

The boosting method is a method generating a more accurate and strong machine learning model by combining weak machine learning models. The boosting method is a method in which each weak machine learning model works in order, and the weak machine learning model executed later additionally explore parts that the previous weak machine leaning model didn't find. For example, the boosting method may be random forest, gradient boosting, extra Gradient Boost (XGBoost), etc.

An artificial neural network is a machine learning algorithm that imitates operating principles of human brain, and analyzes and learns complex data based on multiple artificial neurons connected to each other. The artificial neural network may be i) a Multi-Layer Perceptron (MLP), which is the most basic artificial neural network structure consisting of input layer, hidden layer, and output layer, ii) a Convolutional Neural Network (CNN) that performs a convolution operation to extract image features and reduces dimension through a pooling operation, and iii) a Recurrent Neural Network (RNN), which is an artificial neural network structure used to process ordered data, etc. The artificial neural network may be modified in various ways depending on the complexity and diversity of data.

A model that has been trained based on an artificial neural network may also be an ensemble model that solves problems by learning and combining multiple models rather than learning and using only one model.

The algorithm-based machine learning model and artificial neural network-based learning model may be used complementary to each other. For example, the algorithm-based machine learning model may use the result of the artificial neural network-based learning model, and the artificial neural network-based learning model may use the result of the algorithm-based machine learning model. An ensemble model between the algorithm-based machine learning model and the artificial neural network-based learning model may be used.

For example, the artificial intelligence model MDL may be a reinforcement learning model. The reinforcement learning model is a model that determines or continuously updates an internal parameter by performing learning through reinforcement learning.

Reinforcement learning is based on that when an environment in which an agent may decide what action to take at each moment is given, the agent may select a best action through experience without data.

For example, reinforcement learning may be performed by a Markov decision process (MDP). The Markov decision process is a process in which an environment including information necessary for an agent to take a next action is first given, how the agent will act in the environment is defined, reward or penalty according to the agent's action is defined and an optimal policy is derived through repeated experiences until future reward reaches a highest point.

For example, the reinforcement learning model may be a genetic algorithm model, a particle swarm optimization model or an ant colony optimization model. The genetic algorithm model is a model that may be applied to a variety of problems and is effective for a problem with a large solution space. The particle swarm optimization model is a model that is effective for a continuous problem and is effective to find a global optimal solution. The ant colony optimization model is a model that is effective for a combinatorial optimization problem or a path problem.

Figure 5:
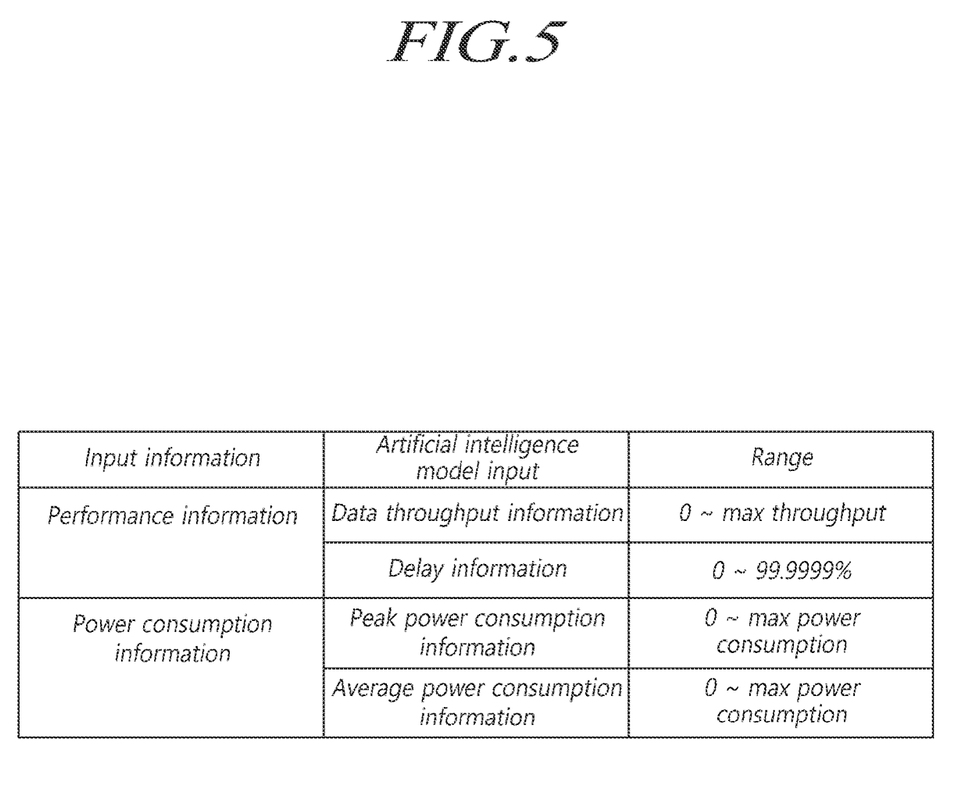
FIG. 5 is a diagram showing an example of information inputted to the artificial intelligence model according to an embodiment of the present disclosure.

FIG. 5 is a diagram showing an example of information inputted to the artificial intelligence model MDL according to an embodiment of the present disclosure.

In FIG. 5, performance information for the storage device 310 may include at least one of data throughput information and delay information.

The data throughput information may indicate data throughput being the size of data read from or written to the storage device 310 during a predetermined time period. For example, the suspend parameter determination device 320 may receive from the storage device 310 a response for the size of data read or written during a predetermined time period, and may determine data throughput on the basis of the response. For example, the range of data throughput may be between 0 and a preset maximum throughput value.

The delay information may indicate the percentage of read commands processed within corresponding reference processing times among read commands transmitted to the storage device 310 during a predetermined time period. The reference processing times of read commands may differ from each other, and may be determined on the basis of the sizes of data requested by the read commands.

For example, when 99 read commands among 100 read commands transmitted to the storage device 310 are processed within reference processing times, delay information may indicate 99% (=99/100). For example, the range of delay information may be between 0 and a preset percentage value (e.g., 99.9999%).

Power consumption information for the storage device 310 may include at least one of peak power consumption information and average power consumption information.

Peak power consumption information may indicate the value of maximum power consumed by the storage device 310 during a predetermined time period. For example, the range of peak power consumption information may be between 0 and a preset maximum power consumption value.

Average power consumption information may indicate the average value of power consumed by the storage device 310 during a predetermined time period. The range of average power consumption information may also be between 0 and a preset maximum power consumption value.

Figure 6:
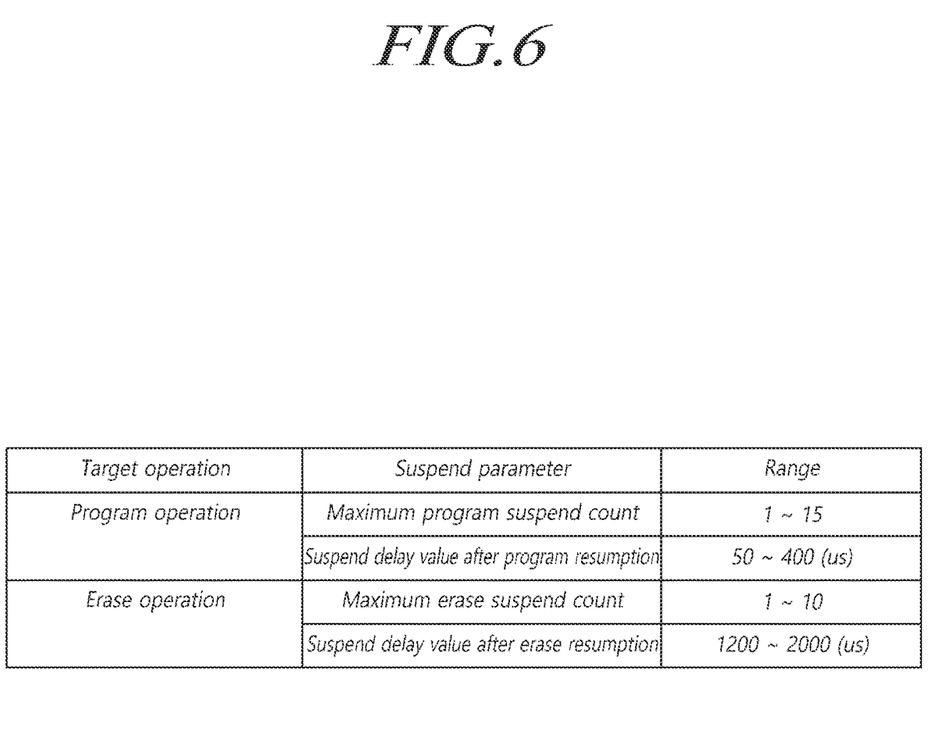
FIG. 6 is a diagram showing an example of a suspend parameter according to an embodiment of the present disclosure.

FIG. 6 is a diagram showing an example of a suspend parameter according to an embodiment of the present disclosure. Referring to FIG. 6, a suspend parameter may include at least one of a maximum program suspend count, a maximum erase suspend count, a suspend delay value after program resumption and a suspend delay value after erase resumption.

The maximum program suspend count and the suspend delay value after program resumption may be used to control suspend for a program operation, and the maximum erase suspend count and the suspend delay value after erase resumption may be used to control suspend for an erase operation.

The maximum program suspend count may indicate a maximum count by which one program operation may be suspended. After a program operation is suspended by the maximum program suspend count, the corresponding program operation is no longer suspended by a read operation until the corresponding program operation is completed.

For example, the range of the maximum program suspend count may be between 1 and 15.

The maximum erase suspend count may indicate a maximum count by which one erase operation may be suspended. After an erase operation is suspended by the maximum erase suspend count, the corresponding erase operation is no longer suspended by a read operation until the corresponding erase operation is completed.

For example, the range of the maximum erase suspend count may be between 1 and 10.

The suspend delay value after program resumption may indicate a time during which a non-suspendable state continues after one program operation is resumed. After a program operation is resumed, the corresponding program operation may be suspended by a read operation after a time elapses by the suspend delay value after program resumption.

For example, the suspend delay value after program resumption may be between 50 us and 400 us.

The suspend delay value after erase resumption may indicate a time during which a non-suspendable state continues after one erase operation is resumed. After an erase operation is resumed, the corresponding erase operation may be suspended by a read operation after a time elapses by the suspend delay value after erase resumption.

For example, the suspend delay value after erase resumption may be between 1200 us and 2000 us.

Figure 7:
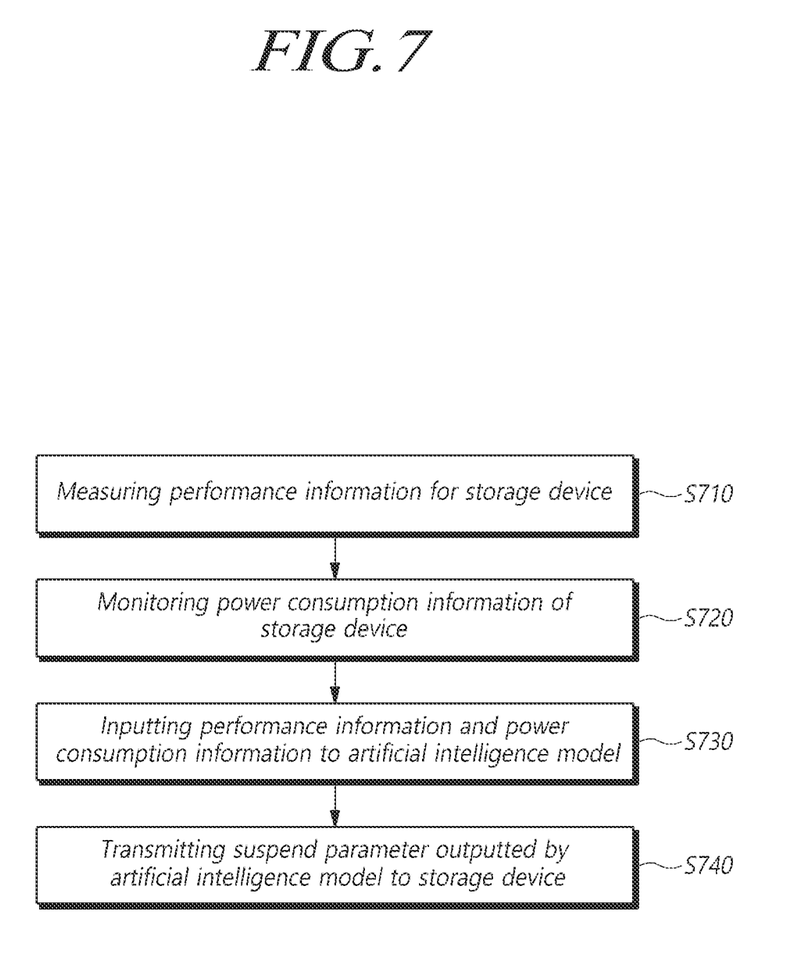
FIG. 7 is a flowchart showing a suspend parameter determination method according to an embodiment of the present disclosure.

FIG. 7 is a flowchart showing a suspend parameter determination method according to an embodiment of the present disclosure.

Referring to FIG. 7, the suspend parameter determination method may include S710 of measuring performance information for the storage device 310.

For example, performance information may include at least one of data throughput information and delay information. The data throughput information may indicate the size of data read from or written to the storage device 310 during a predetermined time period. The delay information may indicate the percentage of read commands processed within reference processing times among read commands transmitted to the storage device 310.

The suspend parameter determination method may include S720 of monitoring power consumption information of the storage device 310.

For example, power consumption information may include at least one of peak power consumption information of the storage device 310 and average power consumption information of the storage device 310, during a predetermined time period.

The suspend parameter determination method may include S730 of inputting the performance information and the power consumption information to the artificial intelligence model MDL.

The suspend parameter determination method may include S740 of transmitting to the storage device 310 a suspend parameter outputted by the artificial intelligence model MDL. The suspend parameter may be used to control a suspend operation for a program operation or an erase operation being executed by the storage device 310.

For example, the suspend parameter may include at least one of a maximum program suspend count, a maximum erase suspend count, a suspend delay value after program resumption and a suspend delay value after erase resumption. The maximum program suspend count may indicate a maximum count by which one program operation may be suspended. The maximum erase suspend count may indicate a maximum count by which one erase operation may be suspended. The suspend delay value after program resumption may indicate a time during which a non-suspendable state continues after one program operation is resumed. The suspend delay value after erase resumption may indicate a time during which a non-suspendable state continues after one erase operation is resumed.

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of this disclosure should be interpreted in connection with the appended claims and encompass all equivalents falling within the scope of the appended claims. Furthermore, the embodiments may be combined to form additional embodiments.

What is claimed is:

1. A suspend parameter determination device comprising:
   a power monitoring circuit configured to monitor power consumption information of a storage device;
   a memory device configured to store an artificial intelligence model; and
   a control circuit configured to load the artificial intelligence model, input data to the artificial intelligence model, including both performance information for the storage device and the power consumption information received from the power monitoring circuit, and transmit, to the storage device, a suspend parameter outputted by the artificial intelligence model, the suspend parameter based on learning the data input to the artificial intelligence model,
   wherein the suspend parameter is used to control a suspend operation for a program operation or an erase operation being executed by the storage device, and
   wherein the artificial intelligence model is a reinforcement learning model which learns and selects which actions to take based on an experienced best action.

2. The suspend parameter determination device according to claim 1, wherein the performance information includes at least one of data throughput information and delay information,
   wherein the throughput information indicates a size of data read from or written to the storage device during a predetermined time period, and
   wherein the delay information indicates a percentage of read commands processed within reference processing times among read commands transmitted to the storage device.

3. The suspend parameter determination device according to claim 1, wherein the power consumption information includes at least one of peak power consumption information of the storage device and average power consumption information of the storage device, during a predetermined time period.

4. The suspend parameter determination device according to claim 1, wherein the reinforcement learning model is a genetic algorithm model, a particle swarm optimization model or an ant colony optimization model.

5. The suspend parameter determination device according to claim 1, wherein the suspend parameter includes at least one of a maximum program suspend count, a maximum erase suspend count, a suspend delay value after program resumption, and a suspend delay value after erase resumption,
   wherein the maximum program suspend count indicates a maximum count by which one program operation is able to be suspended,
   wherein the maximum erase suspend count indicates a maximum count by which one erase operation is able to be suspended,
   wherein the suspend delay value after program resumption indicates a time during which a non-suspendable state continues after one program operation is resumed, and
   wherein the suspend delay value after erase resumption indicates a time during which a non-suspendable state continues after one erase operation is resumed.

6. A suspend parameter determination method comprising:
   measuring performance information for a storage device;

monitoring power consumption information of the storage device;

inputting data, to an artificial intelligence model, including both the performance information and the power consumption information; and transmitting, to the storage device, a suspend parameter outputted by the artificial intelligence model, the suspend parameter based on learning the data input to the artificial intelligence model, wherein the suspend parameter is used to control a suspend operation for a program operation or an erase operation being executed by the storage device, and wherein the artificial intelligence model is a reinforcement learning model which learns and selects which actions to take based on an experienced best action.

7. The suspend parameter determination method according to claim 6, wherein the performance information includes at least one of data throughput information and delay information, wherein the throughput information indicates a size of data read from or written to the storage device during a predetermined time period, and wherein the delay information indicates a percentage of read commands processed within reference processing times among read commands transmitted to the storage device.

8. The suspend parameter determination method according to claim 6, wherein the power consumption information includes at least one of peak power consumption information of the storage device and average power consumption information of the storage device, during a predetermined time period.

9. The suspend parameter determination method according to claim 6, wherein the suspend parameter includes at least one of a maximum program suspend count, a maximum erase suspend count, a suspend delay value after program resumption, and a suspend delay value after erase resumption, wherein the maximum program suspend count indicates a maximum count by which one program operation is able to be suspended, wherein the maximum erase suspend count indicates a maximum count by which one erase operation is able to be suspended, wherein the suspend delay value after program resumption indicates a time during which a non-suspendable state continues after one program operation is resumed, and wherein the suspend delay value after erase resumption indicates a time during which a non-suspendable state continues after one erase operation is resumed.

10. A system comprising:

a storage device; and a suspend parameter determination device configured to monitor power consumption information of the storage device, input data to an artificial intelligence model including both performance information for the storage device and the power consumption information of the storage device, and transmit, to the storage device, a suspend parameter outputted by the artificial intelligence model, the suspend parameter based on learning the data input to the artificial intelligence model, wherein the storage device stores the suspend parameter in a suspend parameter table and controls a suspend operation for a program operation or an erase operation being executed, on the basis of the suspend parameter stored in the suspend parameter table, and wherein the artificial intelligence model is a reinforcement learning model which learns and selects which actions to take based on an experienced best action.

11. The system according to claim 10, wherein the performance information includes at least one of data throughput information and delay information, wherein the throughput information indicates a size of data read from or written to the storage device during a predetermined time period, and wherein the delay information indicates a percentage of read commands processed within reference processing times among read commands transmitted to the storage device.

12. The system according to claim 10, wherein the power consumption information includes at least one of peak power consumption information of the storage device and average power consumption information of the storage device, during a predetermined time period.

13. The system according to claim 10, wherein the artificial intelligence model is a reinforcement learning model.

14. The system according to claim 13, wherein the reinforcement learning model is a genetic algorithm model, a particle swarm optimization model or an ant colony optimization model.

15. The system according to claim 10, wherein the suspend parameter includes at least one of a maximum program suspend count, a maximum erase suspend count, a suspend delay value after program resumption, and a suspend delay value after erase resumption, wherein the maximum program suspend count indicates a maximum count by which one program operation is able to be suspended, wherein the maximum erase suspend count indicates a maximum count by which one erase operation is able to be suspended, wherein the suspend delay value after program resumption indicates a time during which a non-suspendable state continues after one program operation is resumed, and wherein the suspend delay value after erase resumption indicates a time during which a non-suspendable state continues after one erase operation is resumed.

* * * * *